United States Patent Office 3,091,365
Patented May 28, 1963

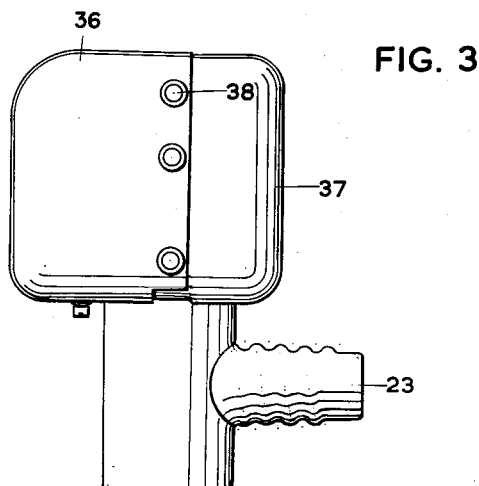
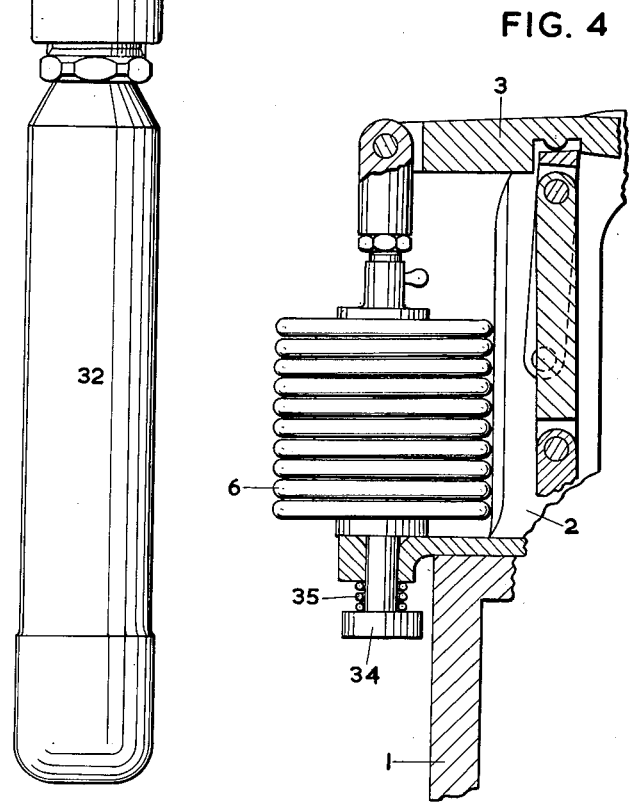

3,091,365
PRESSURE RELEASING MEANS
Henry Leonard Horner, Yeovil, and Humphrey A. S. Hamlin, Montacute, England, assignors to Normalair Limited, Yeovil, England
Filed May 17, 1960, Ser. No. 29,690
Claims priority, application Great Britain Feb. 19, 1960
4 Claims. (Cl. 222—5)

This invention relates to a pressure release device of the type which actuates under a change of pressure or temperature.

In some aircraft that operate at high altitude, the occupants, for example, wear a jerkin-like garment which is connected to the oxygen air and/or oxygen supply system between the oxygen regulator and the occupants' breathing mask. Should the pressure within the aircraft be lost through the fuselage becoming damaged, the oxygen regulator causes a high flow of oxygen to flow into the pressure garment in order to protect the occupant. The garment being then pressurized, the oxygen regulator functions in the normal manner. However, it has been found that certain conditions can arise during which the oxygen regulator is unable to supply oxygen at a rate necessary to inflate the pressure garment in the desired time. To overcome these conditions, a major change of existing components either in the form of the oxygen supply or of the oxygen regulator itself would be necessary.

It is an object of this invention therefore to provide a pressure releasing device, one class of which is described in application No. 38776/58, filed in Great Britain and 855,686 in the U.S.A., whereby the pressure garment worn by the occupants of aircraft can be inflated and pressurized in the required time without involving any structural alteration to existing oxygen regulators.

It is a further object of the invention to provide a pressure releasing device comprising a hollow body having two extending parallel arms, inlet and outlet means adapted for communication with a pressure source and pressure outlet respectively, pressure sensing means in communication with ambient pressure and pressure releasing means responsive to movement transmitted by said pressure sensing means.

It is a further object of the invention to provide a pressure releasing device comprising a hollow body having two extending parallel arms, inlet and outlet means adapted for communication with a pressure source and pressure outlet respectively, means sensitive to changes in temperature and in communication with ambient atmosphere, and pressure releasing means responsive to movement transmitted by said temperature sensing means.

It is a further object of the invention to provide a pressure releasing device as in the two preceding paragraphs wherein said means sensitive to changes in pressure or temperature is manually overridden and said pressure releasing means can be actuated by manual means.

It is a further object of the invention to provide a pressure releasing device as in the first of the three preceding paragraphs wherein said means sensitive to changes in pressure consists in an aneroid bellows.

It is a further object of the invention to provide a pressure releasing device as in the second of the four preceding paragraphs wherein said temperature sensing means consists in flexible bellows means containing a chosen substance expanding with increasing temperature.

It is a further object of the invention to provide a pressure releasing device as in the first and second of the five preceding paragraphs wherein said pressure releasing means comprise a member (hereinafter referred to as a piercing pin) constrained to move, under the influence of a compression spring, in the bore of said hollow body, said piercing pin being pivotally connected to a linkage mechanism which engages in a cut-away portion on a catch arm, said catch arm being pivotally connected at one end to said parallel arms and at the opposite and to said sensing means.

It is a further object of the invention to provide a pressure releasing mechanism as in any of the six preceding paragraphs wherein said pressure releasing means, upon actuation by pressure/temperature sensing means, or by manual means, punctures a bursting disc and releases pressure from a pressure source to said pressure outlet means.

It is a further object of the invention to provide a pressure releasing device as hereinafter described and as shown in the accompanying drawings in which:

FIGURE 3 shows the device attached to a pressure source.

FIGURE 4 is a view of the sensing means adapted for manual operation.

Figure 1:
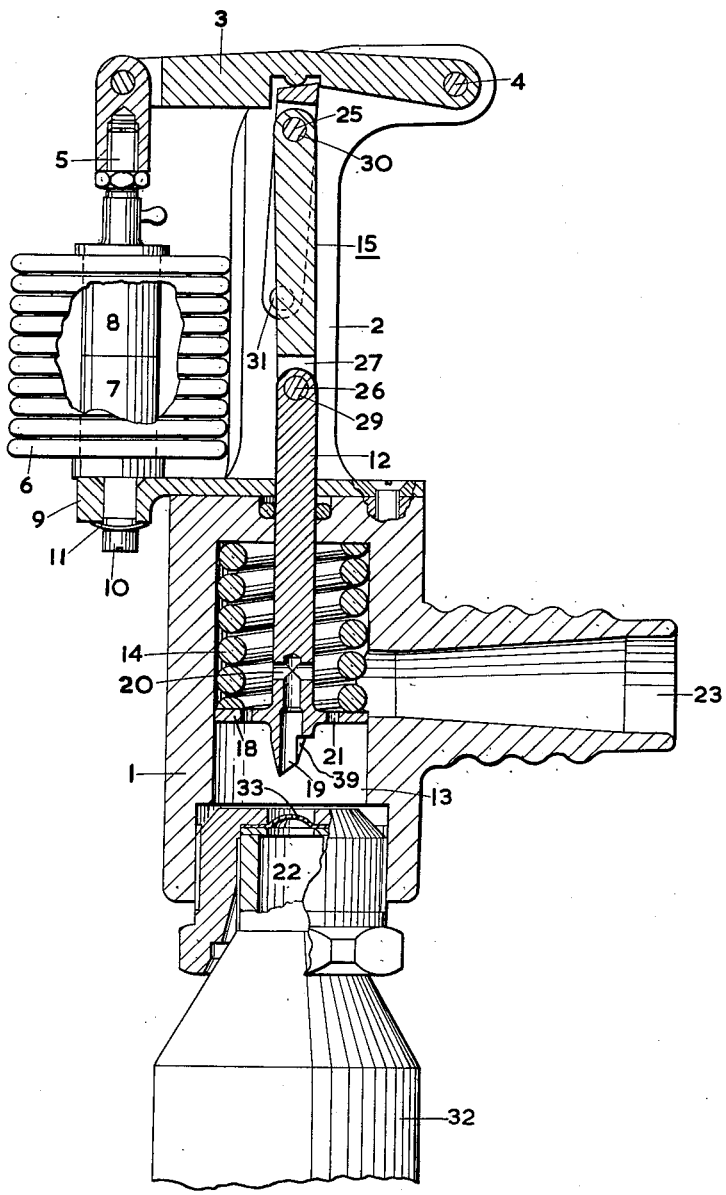
FIGURE 1 is a view of the mechanism in the loaded position.

Referring to FIGURE 1, a hollow cylindrical body 1 has two extending parallel arms 2 to which is pivotally attached a catch arm 3 at a fixed point 4; the other end of said catch arm 3 is secured to an adjuster 5 which in turn is attached to sensing means 6, said sensing means 6 being fitted with internal axially opposed abutments 7 and 8 so that it can be preloaded to expand near the operating pressure. Secured on top of body 1 is a plate 9 onto which is attached said sensing means 6 by means of a bolt 10 and bowed retainer 11. Piercing pin 12 is constrained to move in bore 13 of said body 1 under the influence of compression spring 14, said piercing pin 12 being pivotally connected to linkage mechanism 15 consisting of lever 17 pivotally connected to link 28, said lever 17 being adapted to engage in cutaway portion 16 of said catch arm 3.

In a modified form of the invention the evacuated bellows 6 are filled with a gas, liquid, or wax, or any suitable substance which expands sufficiently to release the mechanism 15 when heated through a pre-determined temperature range.

Figure 2:
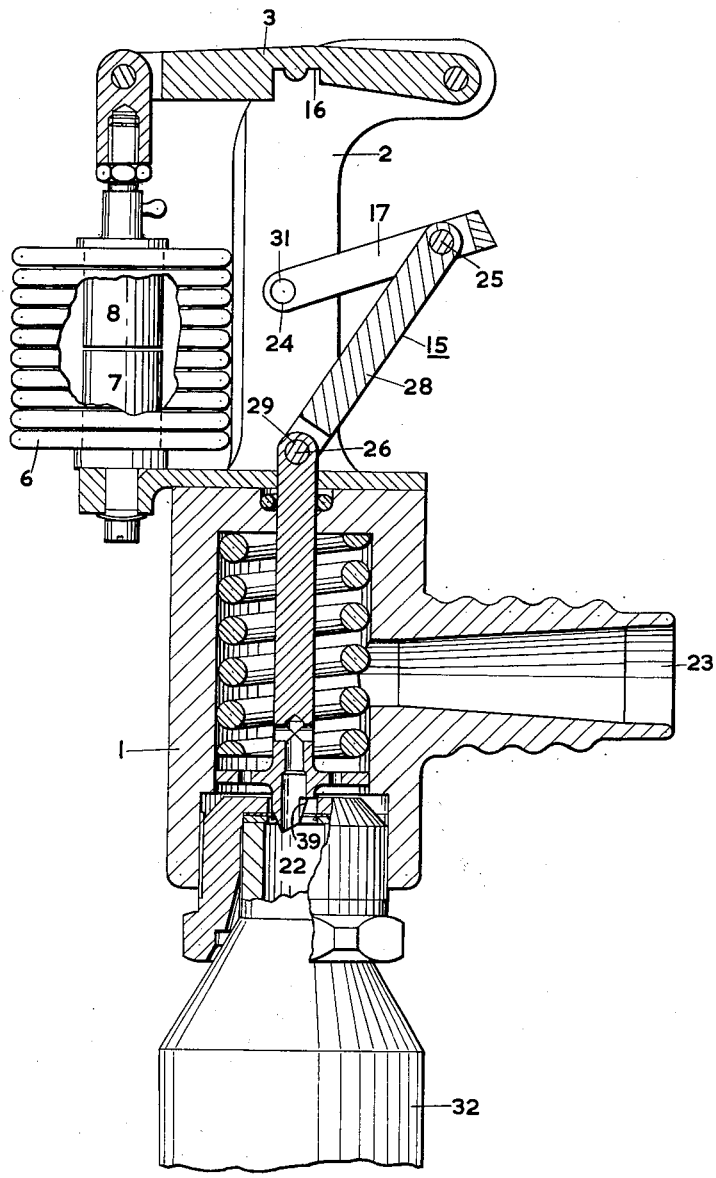
FIGURE 2 is a view of the mechanism in the released position.

In operation, assuming the device to be in the loaded position, upon the pressure surrounding and therefore acting upon the aneroid bellows 6 falling below the pre-determined value, said aneroid bellows 6 will itself commence to expand in a vertical direction and in so doing will cause catch arm 3 to rise. This action, due to lever 17 of linkage mechanism 15 being secured to parallel arms 2 in an offset position, will cause said linkage mechanism 15 to collapse under the influence of spring 14 acting upon shoulder 18 of piercing pin 12 and become disengaged from cutaway portion 16 in catch arm 3. The action of spring 14 acting upon shoulder 18 of piercing pin 12 will force said piercing pin 12 down bore 13 of hollow body 1. The end of piercing pin 12 adjacent to shoulder 18 is cut obliquely and has a gas conducting centre 19 in communication with outlets 20. Said piercing pin 12 is also provided with a cut-away portion 39 (FIGS. 1 and 2) at its leading edge, so that on operation of the device, said piercing pin 12 does not cut a substantially round hole in the said bursting disc 33, but causes a partially severed concave tongue to be bent upwards inside the gas conducting center 19. This ensures that no blockage of the gas conducting center 19, by a completely severed portion of disc, can occur. A plurality of holes 21 are drilled in said shoulder 18 to assist the passage of gas under pressure from a pressure inlet 22 to a pressure outlet 23.

When the device is in the loaded position, as shown in FIGURE 1, the spring load is taken by three pivots 24, 25 and 26, the first being offset from the axis of bore 13 and co-operating with the lower end of the lever 17. This lever 17 is of inverted U form and has said pivot 25 near its end portion which contacts cutaway portion 16 of catch arm 3; said pivot point 25 is substantially on the axis of said bore 13 when said device is loaded. Pivot 26 is also on this axis and adjacent to the end of piercing pin 12 remote from gas conducting centre 19 and co-operates with the fork-end 27 of link 28 forming part of linkage mechanism 15. This link 28 is secured to piercing pin 12 with a pin 29 and to lever 17 by pin 30, said lever 17 being in turn secured to said parallel arms 2 by pins 31.

To ensure rapid inflation of pressure jerkins worn by occupants of aircraft, in the event of pressure in the aircraft being lost, the device already described can, by suitable means, for example screwed threads, be attached to a pressure source 32 (FIGURE 3) of the type sealed with a thin disc 33 herein described as a bursting disc.

In the event of the aforementioned conditions arising, the device operates in a manner already described and causes bursting disc 33 to become punctured and gas under pressure to pass via gas conducting centre 19, outlets 20, holes 21 and outlet 23 to said pressure jerkin.

Referring to FIGURE 4, in the event of the occupants of an aircraft requiring to inflate said pressure jerkin manually, the influence of the aneroid bellows 6 may be overridden by pushing in release knob 34 and compressing spring 35.

Covers 36 and 37 are attached to said extending parallel arms 2 by screws 38 (FIGURE 3).

In operation of the modified form of the invention the device could be installed in fire zones on aircraft, ships, vehicles, and like places, whereupon an abnormally high temperature within the region of the device, caused by fire on malfunctioning of equipment, would actuate the device by expanding the bellows 6, and pressure energy from the source 32 could be used to operate a warning device, release fire extinguishing fluid, or an inert gas could be stored in source 32 for fire extinguishing purposes.

We claim as our invention:
1. Gas release means for use with a gas pressure source having a bursting disc, comprising the combination of:
   a piercing pin having means to pierce said disc and means to permit flow of gas from said source when the disc is pierced;
   a compression spring coaxial with said pin and urging said pin away from a cocked position and toward the disc;
   a body housing the spring and pin, and having two spaced upstanding arms;
   a U-shaped lever pivotably connected by its open end to the spaced arms and pivotably movable between said spaced arms, said lever having its closed end remote from said pin and disc;
   a link member disposed between the legs of said lever, said link member having one end pivotably connected to the piercing pin and the other end pivotably connected to the lever adjacent the closed end of said lever, an imaginary line connecting the ends of the link member passing close to the lever pivots to provide a small offset when the pin is in the cocked position;
   expansible means to control the movement of said pin;
   and a catch arm having one end pivotably connected to the spaced upstanding arms and the other end pivotably connected to the expansible means, the said catch arm defining a cutaway portion, for engagement with the closed end of the lever, substantially midway between the ends of the catch arm, the lever being substantially at right angles to and engaged by the catch arm at the cutaway portion when the pin is in its cocked position;
   movement of the expansible means by a predetermined amount causing the catch arm to release the lever from the cutaway portion, thereby allowing the lever to rotate about its open end and increase the amount of said offset, and further allowing the pin to pierce the disc by the urging of said spring.

2. A gas release means as set forth in claim 1, wherein said expansible means comprises an aneroid bellows expanding with increase in altitude, and expansion of the bellows causes said catch arm to release said piercing pin.

3. A gas release means as set forth in claim 1, wherein said expansible means comprises a temperature sensitive bellows containing a substance expansible with increasing temperature and the expansion thereof causes the release of said lever 4. A gas release means as set forth in claim 1, wherein said expansible means includes manual release means.

References Cited in the file of this patent

UNITED STATES PATENTS

| 1,176,010 | Williams | Mar. 21, 1916 |
| 1,208,130 | Fulton | Dec. 12, 1916 |
| 1,671,368 | Johann | May 29, 1928 |
| 1,671,369 | Johann | May 29, 1928 |
| 2,127,395 | Evans | Aug. 16, 1938 |
| 2,410,310 | Smith | Oct. 29, 1946 |
| 2,697,538 | Seeler | Dec. 21, 1954 |
| 2,703,572 | Seeler | Mar. 8, 1955 |
| 2,707,605 | Sieverts | May 3, 1955 |
| 2,708,976 | Boice | June 24, 1955 |
| 2,892,456 | Seeler | June 30, 1959 |

FOREIGN PATENTS

| 77,181 | Sweden | Jan. 26, 1932 |
| 782,331 | France | Mar. 11, 1935 |